United States Patent [19]

Sakowski et al.

[11] 4,335,090

[45] Jun. 15, 1982

[54] PREPARING CALCIUM HYPOCHLORITE FROM TRIPLE SALT

[75] Inventors: Walter J. Sakowski, Cleveland; Larry G. Carty, Charleston; Craig A. Foster, Cleveland, all of Tenn.

[73] Assignee: Olin Corporation, New Haven, Conn.

[21] Appl. No.: 240,339

[22] Filed: Mar. 4, 1981

[51] Int. Cl.³ .............................................. C01B 11/06
[52] U.S. Cl. .................................................. 423/474
[58] Field of Search ........................................ 423/474

[56] References Cited

U.S. PATENT DOCUMENTS

| 1,787,048 | 12/1930 | MacMullin | 423/474 |
|---|---|---|---|
| 1,937,613 | 12/1933 | Weber | 423/474 |
| 2,368,042 | 6/1945 | Robson | 423/474 |
| 3,241,912 | 3/1966 | Nicolaisen | 423/474 |
| 4,258,025 | 3/1981 | Hoffer | 423/474 |

FOREIGN PATENT DOCUMENTS 1131090 10/1968 United Kingdom ................ 423/474

*Primary Examiner*—Brian E. Hearn
*Attorney, Agent, or Firm*—James B. Haglind; Donald F. Clements

[57] ABSTRACT

In a process for preparing granular calcium hypochlorite particles, wherein hydrated triple salt crystals of calcium hypochlorite, sodium hypochlorite, and sodium chloride are reacted with a chlorinated lime slurry to form particles of calcium hypochlorite dihydrate, the resulting slurry is processed to separate the calcium hypochlorite dihydrate particles and the resulting particles are dried to form granular calcium hypochlorite particles, the improvement which comprises:

a. continuously feeding triple salt crystals and a chlorinated lime slurry to a paste reactor containing an aqueous paste slurry of calcium hypochlorite dihydrate particles to form additional aqueous paste slurry of calcium hypochlorite dihydrate particles,
b. continuously removing a portion of the paste slurry from the paste reactor,
c. continuously dividing the removed portion of paste slurry into a first part and a second part,
d. continuously recycling said first part of the paste slurry to the paste reactor,
e. separating said second part into particles of calcium hypochlorite in the form of a wet cake and a resulting clarified mother liquor, and
f. drying said wet cake to form granular particles of calcium hypochlorite.

9 Claims, No Drawings

PREPARING CALCIUM HYPOCHLORITE FROM TRIPLE SALT

This invention relates to an improved process for preparing calcium hypochlorite.

Numerous processes have been developed for preparing calcium hypochlorite in granular form for use in the purification of swimming pool water and the like. In one process, a hydrated triple salt, $Ca(ClO)_2 \cdot NaClO \cdot 12H_2O$ is first prepared by chlorinating a slurry of lime in caustic soda in equivalent amounts, and cooling to below about $-12°$ C. The preparation of the triple salt is described in U.S. Pat. Nos. 1,754,475, which issued to Robert B. MacMullin on Apr. 15, 1930 and 1,787,080, which issued to Robert B. MacMullin et al on Dec. 30, 1930. The resulting triple salt crystals are separated from the mother liquor and the mother liquor is used as a bleach or treated for disposal. Separately a chlorinated lime slurry is prepared by mixing lime with water and chlorinating the resulting slurry to form an aqueous solution of calcium hypochlorite and calcium chloride, which may contain some unreacted lime to form a slurry. This slurry is normally reacted on a batch basis with triple salt crystals in a paste reactor to form a slurry of calcium hypochlorite dihydrate particles, which are separated, dried, and used in water purification. The preparation of calcium hypochlorite by the triple salt technique is described in U.S. Pat. No. 1,787,080 and in U.S. Pat. No. 1,787,048 which issued to Robert Burns MacMullin et al on Dec. 30, 1930.

In this triple salt prior art technique for preparing calcium hypochlorite, the required amount of chlorinated lime slurry is added to the paste reactor. The reactor is normally provided with a suitable means for melting the triple salt crystals, which melt at a temperature of about $15°–20°$ C., such as steam spargers, heating coils, and the like. The triple salt crystals are then gradually added until the reactor is filled to the desired level. Heat is applied to effect melting of the triple salt crystals at a controlled rate. When the triple salt crystals are first fed to the reactor containing the chlorinated lime slurry, a large amount of extremely fine nuclei of calcium hypochlorite dihydrate particles forms in the slurry. Although the proportion of fine nuclei gradually diminishes as the paste reactor is filled, there is still a substantial quantity of fine nuclei present. The presence of the fine particles in the filter cake fed to the drying system causes excessive retention of the paste filtrate within the cake, which places an unnecessary load on the dryer system. For example, the amount of water generally contained in the wet cake of calcium hypochlorite dihydrate fed to the drying system generally ranges from about 46 to about 50 percent by weight.

There is a need at the present time to improve the triple salt process of the prior art. Areas for improvement of this process are the need to reduce the number of fine particles of calcium hypochlorite dihydrate produced in the paste reactor and to reduce the quantity of paste filtrate contained in the wet cake fed to the drying system.

It is a primary object of this invention to provide an improved triple salt process for preparing calcium hypochlorite.

Still another object of this invention is to provide an improved triple salt process for preparing calcium hypochlorite in which the proportion of filtrate retention in the wet cake fed to the drying system is markedly reduced.

These and other objects of the invention will be apparent from the following detailed description thereof.

Briefly, it has now been discovered that in a process for preparing granular calcium hypochlorite particles, wherein hydrated triple salt crystals of calcium hypochlorite, sodium hypochlorite, and sodium chloride are reacted with a chlorinated lime slurry to form particles of calcium hypochlorite dihydrate, the resulting slurry is processed to separate the calcium hypochlorite dihydrate particles and the resulting particles are dried to form granular calcium hypochlorite particles, the improvement which comprises:

a. continuously feeding triple salt crystals and a chlorinated lime slurry to a paste reactor containing an aqueous paste slurry of calcium hypochlorite dihydrate particles to form additional aqueous paste slurry of calcium hypochlorite dihydrate particles, b. continuously removing a portion of the paste slurry from the paste reactor, c. continuously dividing the removed portion of paste slurry into a first part and a second part, d. continuously recycling said first part of the paste slurry to the paste reactor, e. separating said second part into particles of calcium hypochlorite in the form of a wet cake and a resulting clarified mother liquor, and f. drying said wet cake to form granular particles of calcium hypochlorite.

More in detail, in the improved process of this invention, the triple salt crystals and the chlorinated lime slurry are prepared by substantially the same technique utilized in the prior art. See, for example, U.S. Pat. Nos. 1,787,048, 1,787,080, and 1,754,475 for details on how the triple salt crystals and chlorinated lime slurry are prepared.

In the process of this invention, the triple salt crystals and the chlorinated lime slurry are fed simultaneously to the paste reactor in appropriate proportions to provide the stoichiometric amount of calcium chloride in the lime slurry necessary to react with sodium hypochlorite in the triple salt crystals. The solid triple salt crystals are generally fed to the top or upper portion of the paste reactor through a suitable chute. The chlorinated lime slurry is generally fed through suitable piping to the top or upper portion of the paste reactor.

Triple salt crystals generally have the following typical chemical analysis:

| Component | Percent by Weight |
|---|---|
| $Ca(OCl)_2$ | 26.0–28.3 |
| NaOCl | 8.8–11.1 |
| NaCl | 12.6–14.3 |
| $Ca(ClO_3)_2$ | 0.2–0.4 |
| Total Alkalinity | 0.0–0.3 |
| $H_2O$ | 47.7–50.8 |

Chlorinated lime slurry generally has the following typical chemical analysis:

| Component | Percent by Weight |
|---|---|
| $Ca(OCl)_2$ | 18.5–20.1 |
| $CaCl_2$ | 12.9–14.8 |
| $Ca(ClO_3)_2$ | 0.1–0.5 |
| Inerts | 0.5–1.7 |
| Total Alkalinity | 0.4–0.8 |

| Component | Percent by Weight |
|---|---|
| Water | 63.8–66.1 |

One skilled in the art will recognize that the composition of the triple salt and chlorinated lime slurry may be varied to some degree without departing from the spirit of this invention. At start-up, the paste reactor preferably contains an aqueous paste slurry of granular calcium hypochlorite dihydrate. Slurries of other solids may be employed at start-up, if desired, but optimum results are obtained when calcium hypochlorite is employed.

In reacting these two components in the paste reactor, the feed rate of each component is adjusted to maintain the molar ratio of $CaCl_2:(NaOCl)_2$ in the range from about 0.8:1 to about 1.2:1 and preferably at about 1:1.

A steam coil or other heating means is used to heat the slurry contents of the paste reactor to a temperature in the range from about 15° to about 30° C. and preferably from about 20° to about 28° C.

The reaction in the paste reactor is generally carried out at atmospheric pressure or sub or superatmospheric pressures may be employed, if desired.

The reaction in paste reactor may be carried out under full or substantially full conditions, but the slurry level is maintained at a point which preferably provides a gas space at the top of the paste reactor comprised of from about 10 to about 20 percent of the total volume of the paste reactor. However, any suitable liquid level may be employed.

Suitable agitation is provided in the paste reactor to maintain a substantially homogeneous slurry composition in the paste reactor. The triple salt crystals and chlorinated lime are preferably fed to the paste reactor at a point near the top thereof. With sufficient agitation, the triple salt crystals and chlorinated lime slurry are reacted virtually instantaneously as they enter the slurry of calcium hypochlorite dihydrate particles in the paste reactor.

A portion of the calcium hypochlorite slurry is withdrawn, preferably at a point near the bottom of the paste reactor at a rate equivalent to the combined feed rate of the triple salt crystals, the chlorinated lime slurry and recycle paste slurry in order to maintain the level of paste slurry in the reactor within the above-mentioned ranges. The withdrawn portion of the calcium hypochlorite paste slurry is separated into at least two parts, a first part and a second part. The first part is recycled to the top or upper portion of the paste reactor to improve distribution of calcium hypochlorite nuclei in the paste slurry. If desired, the first part of the paste slurry is recycled to the chute for feeding triple salt crystals in order to prevent blockage of the chute by the crystals. Generally from about 50 to about 95 and preferably from about 65 to about 90 percent by weight of the withdrawn portion is recycled as the first part for this purpose. The second part of the withdrawn portion of paste slurry is conveyed to storage or is directly conveyed to a solid-liquid separation step. A drum filter, centrifuge, leaf filter or any other suitable solids-liquids separation apparatus can be employed to separate the calcium hypochlorite dihydrate wet cake from the paste filtrate. The paste filtrate may be recycled to the triple salt crystallizer where lime and sodium hypochlorite solution are chlorinated to form the triple salt crystals.

The calcium hypochlorite dihydrate wet cake produced by the process of this invention generally contains from about 40 to about 45 percent by weight of water, which is substantially below the water content of calcium hypochlorite dihydrate cakes produced by prior art techniques. This lowered water content indicates that the mean particle size of the calcium hypochlorite dihydrate crystals in the wet cake produced by the improved process of this invention is increased.

The wet cake from the solids-liquids separation step is then dried by conventional techniques such as described in U.S. Pat. No. 2,195,754, which issued to H. L. Robson et al on Apr. 2, 1940.

Because of the increased mean particle size of the calcium hypochlorite dihydrate in the wet cake produced by the process of this invention, it has been found that the drying capacity of the dryer is markedly increased. In addition, lower drying temperatures are needed to effect drying of the calcium hypochlorite particles and as a result, the calcium hypochlorite content and available chlorine content of the final product is increased substantially.

The following example is presented to illustrate the invention more fully. All parts and percentages are by weight unless otherwise specified.

EXAMPLE

A paste reactor having a volume of 6000 gallons was filled with an aqueous slurry of calcium hypochlorite dihydrate to a level of about 90 percent of the reactor volume. The reactor was provided with a motor driven agitator capable of maintaining the slurry in substantially homogeneous condition. Heat was applied to the reactor contents to maintain the temperature of the aqueous slurry at about 25° C.

Triple salt crystals have the formula:

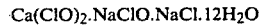

$Ca(ClO)_2 \cdot NaClO \cdot NaCl \cdot 12H_2O$ and the approximate analysis of the wet crystals is:

| Component | Percent by Weight |
|---|---|
| $Ca(OCl)_2$ | 27 |
| NaOCl | 10 |
| NaCl | 13.5 |
| $Ca(ClO_3)_2$ | 0.3 |
| Total Alkalinity | 0.2 |
| $H_2O$ | 49.0 | were continuously fed through a chute to the top of the reactor at the rate of about 23,800 lbs. per hour. A chlorinated lime slurry having the following analysis:

| Component | Percent by Weight |
|---|---|
| $Ca(OCl)_2$ | 19.7 |
| $Ca(OH)_2$ | 0.7 |
| $CaCl_2$ | 14.0 |
| NaCl | 0.8 |
| $Ca(ClO_3)_2$ | 0.4 |
| $H_2O$ | 64.4 | was fed to the reactor at the rate of about 31 gallons per minute. Sufficient heat was applied to the reactor contents to melt the triple salt crystals as soon as possible after they entered the reactor slurry. The resulting paste reactor slurry was continuously withdrawn from the bottom of the reactor at the rate of about 200 gallons per minute. The withdrawn portion of the slurry which had the following analysis:

| Component | Percent by Weight |
|---|---|
| $Ca(OCl)_2$ | 27.91 |
| Total Alkalinity | 0.08 |
| $CaCl_2$ | 0.38 |
| NaCl | 12.48 |
| $Ca(ClO_3)_2$ | 0.62 |
| $H_2O$ | 58.53 | was separated into two portions of approximately 2:1 weight ratio. The larger portion was recycled to the top of the paste reactor. The minor portion was conveyed to a filter and filtered to separate the granular calcium hypochlorite dihydrate particles from the mother liquor. The filtration rate of this slurry was approximately 17 gallons per hour per square foot of filter surface. The water content of the resulting filter cake of particles of calcium hypochlorite was approximately 44.3 percent by weight. This filter cake was processed by conventional techniques and dried to form granular particles of calcium hypochlorite containing about 6.5 percent water as water of hydration.

COMPARATIVE EXAMPLE

For purposes of comparison, a similar process was carried out except that a calcium hypochlorite dihydrate slurry was prepared in a batch reactor by adding all the chlorinated lime to the reactor followed by the addition, with melting, of all of the required triple salt crystals to form an aqueous slurry of calcium hypochlorite dihydrate particles. After the reaction was completed, the resulting slurry was filtered. The filtration rate for this slurry was found to be about 14 gallons per hour per square foot of filter area. This filtration rate under prior art conditions was 16 percent less than the rate obtained for the filter cake prepared by the novel continuous process of this invention. In addition, the resulting filter cake obtained in the prior art process contained about 46.5 percent by weight of water, which increased the energy required for drying by about 5.8 percent, as compared to the energy required for filter cakes prepared by the novel continuous process of this invention.

We claim:

1. In a process for preparing granular calcium hypochlorite particles, wherein hydrated triple salt crystals of calcium hypochlorite, sodium hypochlorite, and sodium chloride are reacted with a chlorinated lime slurry to form particles of calcium hypochlorite dihydrate, the resulting slurry is processed to separate the calcium hypochlorite dihydrate particles and the resulting particles are dried to form granular calcium hypochlorite particles, the improvement which comprises:
   a. continuously feeding triple salt crystals and a chlorinated lime slurry to a paste reactor containing an aqueous paste slurry of calcium hypochlorite dihydrate particles to form additional aqueous paste slurry of calcium hypochlorite dihydrate particles,
   b. continuously removing a portion of the paste slurry from the paste reactor,
   c. continuously dividing the removed portion of paste slurry into a first part and a second part,
   d. continuously recycling said first part of the paste slurry to the paste reactor,
   e. separating said second part into particles of calcium hypochlorite in the form of a wet cake and a resulting clarified mother liquor, and
   f. drying said wet cake to form granular particles of calcium hypochlorite.

2. The process of claim 1 wherein said first part is from about 50 to about 95 percent by weight of said withdrawn portion.

3. The process of claim 2 wherein said first part is from about 65 to about 90 percent by weight of said withdrawn portion.

4. The process of claim 1 wherein the temperature of said calcium hypochlorite dihydrate paste slurry is maintained in the range from about 15° to about 30° C.

5. The process of claim 1 wherein the temperature of said calcium hypochlorite dihydrate paste slurry is maintained in the range from about 20° to about 28° C.

6. The process of claim 1 wherein the molar ratio of $CaCl_2:(NaOCl)_2$ in said paste reactor is from about 0.8:1 to about 1.2:1.

7. The process of claim 1 wherein the molar ratio of $CaCl_2:(NaOCl)_2$ in said paste reactor is about 1:1.

8. The process of claim 1 wherein the level of said paste slurry is maintained at a point which provides a gas space at the top of said paste reactor comprised of from about 10 to about 20 percent of the total volume of paste reactor.

9. The process of claim 8 wherein said reactor at start-up of the process contains an aqueous paste slurry of calcium hypochlorite dihydrate.

* * * * *

UNITED STATES PATENT AND TRADEMARK OFFICE
CERTIFICATE OF CORRECTION

PATENT NO. : 4,335,090
DATED : June 15, 1982
INVENTOR(S) : Walter J. Sakowski, Larry G. Carty and Craig A. Foster It is certified that error appears in the above—identified patent and that said Letters Patent is hereby corrected as shown below:

In Column 1, line 10, delete "Ca(ClO)$_2$.NaClO.12-H$_2$O" and insert --Ca(ClO)$_2$ · NaClO · NaCl · 12H$_2$O--.

In Column 1, line 63, delete "it" and insert --It--.

In Column 4, line 38, delete "Ca(ClO)$_2$.NaClO.NaCl.12H$_2$O" and insert --Ca(ClO)$_2$ · NaClO · NaCl · 12H$_2$O--.

Signed and Sealed this

Fourteenth Day of September 1982

[SEAL]

Attest:

GERALD J. MOSSINGHOFF

Attesting Officer    Commissioner of Patents and Trademarks